(12) United States Patent  
Summer

(10) Patent No.: US 8,473,101 B2
(45) Date of Patent: Jun. 25, 2013

(54) COORDINATED ACTION ROBOTIC SYSTEM AND RELATED METHODS

(75) Inventor: Matthew D. Summer, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 656 days.

(21) Appl. No.: 12/545,367

(22) Filed: Aug. 21, 2009

(65) Prior Publication Data

US 2011/0046781 A1    Feb. 24, 2011

(51) Int. Cl.
*G05B 19/04*    (2006.01)
*G05B 19/418*    (2006.01)

(52) U.S. Cl.
USPC ........... 700/247; 700/245; 700/248; 700/251; 700/253; 700/255; 700/257; 700/264; 318/568.11; 318/568.12; 318/568.19; 318/580; 318/586

(58) Field of Classification Search
USPC ................. 700/245, 247, 248, 251, 253, 255, 700/257, 258, 259, 264; 318/568.1, 568.11, 318/568.12, 568.16, 568.19, 580, 586, 587
See application file for complete search history.

(56) References Cited

U.S. PATENT DOCUMENTS

| | | | | |
|---|---|---|---|---|
| 4,736,826 A | * | 4/1988 | White et al. | 191/12.2 A |
| 4,741,245 A | * | 5/1988 | Malone | 89/41.03 |
| 4,746,977 A | * | 5/1988 | White | 348/114 |
| 5,155,683 A | * | 10/1992 | Rahim | 701/25 |
| 5,336,982 A | * | 8/1994 | Backes | 318/568.22 |
| 5,404,661 A | * | 4/1995 | Sahm et al. | 37/348 |
| 6,032,084 A | * | 2/2000 | Anderson et al. | 700/241 |
| 6,535,793 B2 | * | 3/2003 | Allard | 700/259 |
| 6,845,297 B2 | * | 1/2005 | Allard | 700/259 |
| 6,895,305 B2 | * | 5/2005 | Lathan et al. | 700/245 |
| 6,898,484 B2 | | 5/2005 | Lemelson et al. | 700/245 |
| 7,162,199 B1 | * | 1/2007 | Glickstein et al. | 455/3.02 |
| 7,211,980 B1 | * | 5/2007 | Bruemmer et al. | 318/587 |
| 7,539,557 B2 | * | 5/2009 | Yamauchi | 700/245 |
| 7,714,895 B2 | * | 5/2010 | Pretlove et al. | 348/211.2 |
| 2003/0216834 A1 | * | 11/2003 | Allard | 700/245 |
| 2004/0073337 A1 | * | 4/2004 | McKee et al. | 700/245 |
| 2004/0189675 A1 | * | 9/2004 | Pretlove et al. | 345/633 |
| 2005/0096790 A1 | * | 5/2005 | Tamura et al. | 700/245 |
| 2008/0009970 A1 | * | 1/2008 | Bruemmer | 700/245 |
| 2008/0063400 A1 | * | 3/2008 | Hudson et al. | 398/106 |
| 2008/0281467 A1 | * | 11/2008 | Pinter | 700/245 |
| 2008/0294288 A1 | * | 11/2008 | Yamauchi | 700/258 |

(Continued)

FOREIGN PATENT DOCUMENTS

WO    WO 2009019699 A2 *    2/2009

*Primary Examiner* — Dalena Tran
*Assistant Examiner* — Jamie Figueroa
(74) *Attorney, Agent, or Firm* — Allen, Dyer, Doppelt, Milbrath & Gilchrist, P.A.

(57) ABSTRACT

A coordinated action robotic system may include a plurality of robotic vehicles, each including a platform and at least one manipulator movable relative thereto. The robotic system may also include a remote operator control station that may include a respective controller for each manipulator. The remote operator control station may also include a mapping module to map movement of each manipulator relative to its platform. Operation of the controllers for manipulator movement in a given direction produces corresponding movement of the respective manipulators in the given direction such that the robotic vehicles may be controlled as if they were one robotic vehicle. The coordinated movement may result in increased operational efficiency, increased operational dexterity, and increased ease of controlling the robotic vehicles.

24 Claims, 5 Drawing Sheets

U.S. PATENT DOCUMENTS

| | | | |
|---|---|---|---|
| 2009/0037024 A1* | 2/2009 | Jamieson et al. | 700/264 |
| 2009/0055023 A1* | 2/2009 | Walters et al. | 700/259 |
| 2009/0065271 A1* | 3/2009 | Won | 180/9.32 |
| 2009/0234499 A1* | 9/2009 | Nielsen et al. | 700/250 |
| 2010/0017046 A1* | 1/2010 | Cheung et al. | 701/2 |
| 2010/0073490 A1* | 3/2010 | Wang et al. | 348/207.11 |
| 2010/0179691 A1* | 7/2010 | Gal et al. | 700/259 |
| 2011/0035054 A1* | 2/2011 | Gal et al. | 700/258 |

* cited by examiner

COORDINATED ACTION ROBOTIC SYSTEM AND RELATED METHODS

FIELD OF THE INVENTION

The present invention relates to the field of robotic vehicles, and more particularly, coordinated control of robotic vehicles and related methods.

BACKGROUND OF THE INVENTION

A robot may be used for a variety of unmanned operations. One example of an unmanned robot is an unmanned ground vehicle (UGV), for example, the iRobot Packbot, available from iRobot of Bedford, Mass. A UGV may typically include a platform, and a manipulator carried by the platform that is often primitive and includes joint level control. The single manipulator often performs all of the operations.

A commercial-off-the-shelf robot may have increased flexibility and may include dual arm, dexterous manipulators. One particular example is the MotoMan DIA 10, available from Motoman, Inc. of West Carrollton, Ohio. Academia and research groups may also provide robots with increased functionality, for example, the NASA Robonaut.

U.S. Pat. No. 6,898,484 to Lemelson et al. discloses a system for controlling manufacturing operations. A location of a target object relative to a robotic manipulator is input into a control system. The manipulator and target object are located and tracked via the global positioning system. The control system directs the manipulator to perform operations on each target object based upon the location of the manipulator and target object.

Reduced cost and reduced weight may correspond to limited robot functions. Control of a robot may be limited by a number of ways the robot may be manipulated. More particularly, for example, a robot may have limited dexterity and limited movement in a finite number of directions as a result.

Moreover, when more than one robot having limited dexterity and limited movement is used, it may be difficult for an operator to control each robot. More particularly, when each robot's platform is positioned in a different direction, an operator may find it increasingly difficult to control respective manipulators in a common direction or have coordinated movements from a controller correspond to coordinate movements of the respective manipulators.

SUMMARY OF THE INVENTION

In view of the foregoing background, it is therefore an object of the present invention to provide coordinated robotic vehicle manipulator movements.

This and other objects, features, and advantages in accordance with the present invention are provided by a coordinated action robotic system that includes a plurality of robotic vehicles. Each of the plurality of robotic vehicles may include a platform and at least one manipulator movable relative thereto. The robotic system may also include a remote operator control station that may include a respective controller for each manipulator, for example. The remote operator control station may further include a mapping module to map movement of each manipulator relative to its platform so that operation of the controllers for manipulator movement in a given direction produces corresponding movement of the respective manipulators in the given direction. Accordingly, the coordinated action robotic system provides coordinated robotic vehicle manipulator movements, and thus increased dexterity thereof.

The mapping module may map movement of each manipulator based upon a common coordinate system. The common coordinate system may be based upon a selected one of the robotic vehicles, for example.

Each robotic vehicle may include a sensor arrangement for sensing a relative position and orientation between the platform and the at least one manipulator. The mapping module may map movement of each manipulator based upon the relative position and orientation between each platform and at least one manipulator, for example. The sensor arrangement may also sense yaw, heading, and attitude of the platform.

Each robotic vehicle may further include a geospatial position determining device. The mapping module may map movement of each manipulator based upon the geospatial position of each robotic vehicle.

The robotic system may further include a respective communications link between each robotic vehicle and the remote operator control station. At least one of the communications links may include a wireless communications link, for example.

Each robotic vehicle may further include at least one image sensor carried by the platform. The remote operator control station may further include at least one display for displaying images from the image sensors. Each robotic vehicle may include a ground drive arrangement carried by the platform, for example.

A method aspect may include coordinating robotic action in a robotic system. The robotic system may include a plurality of robotic vehicles, each including a platform and at least one manipulator movable relative thereto, and a remote operator control station including a respective controller for each manipulator, for example. The method may include mapping movement, using the remote operator control station, of each manipulator relative to its platform so that operation of the controllers for manipulator movement in a given direction produces corresponding movement of the respective manipulators in the given direction.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
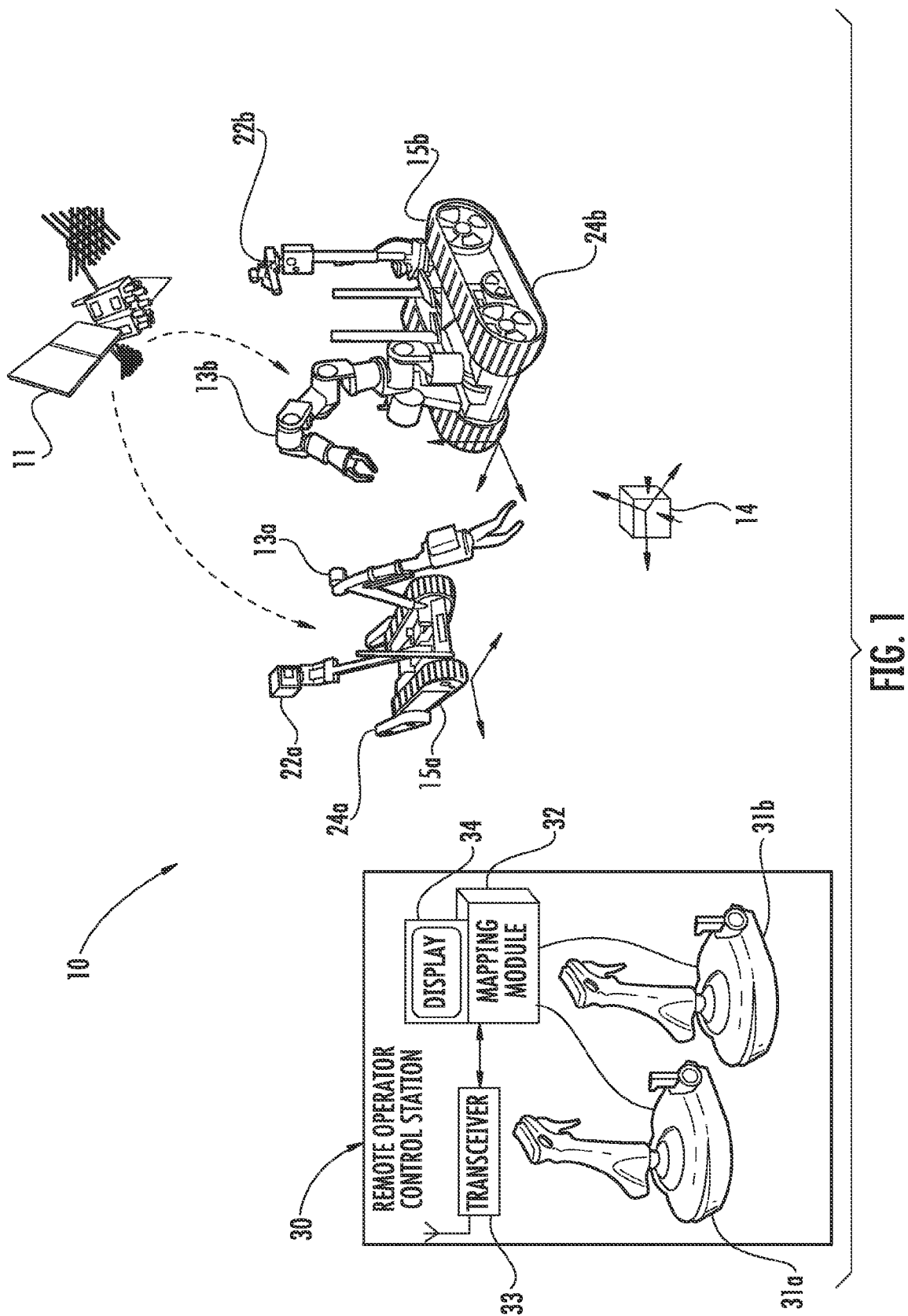
FIG. 1 is a schematic diagram of a coordinated action robotic system in accordance with the present invention.
Figure 2:
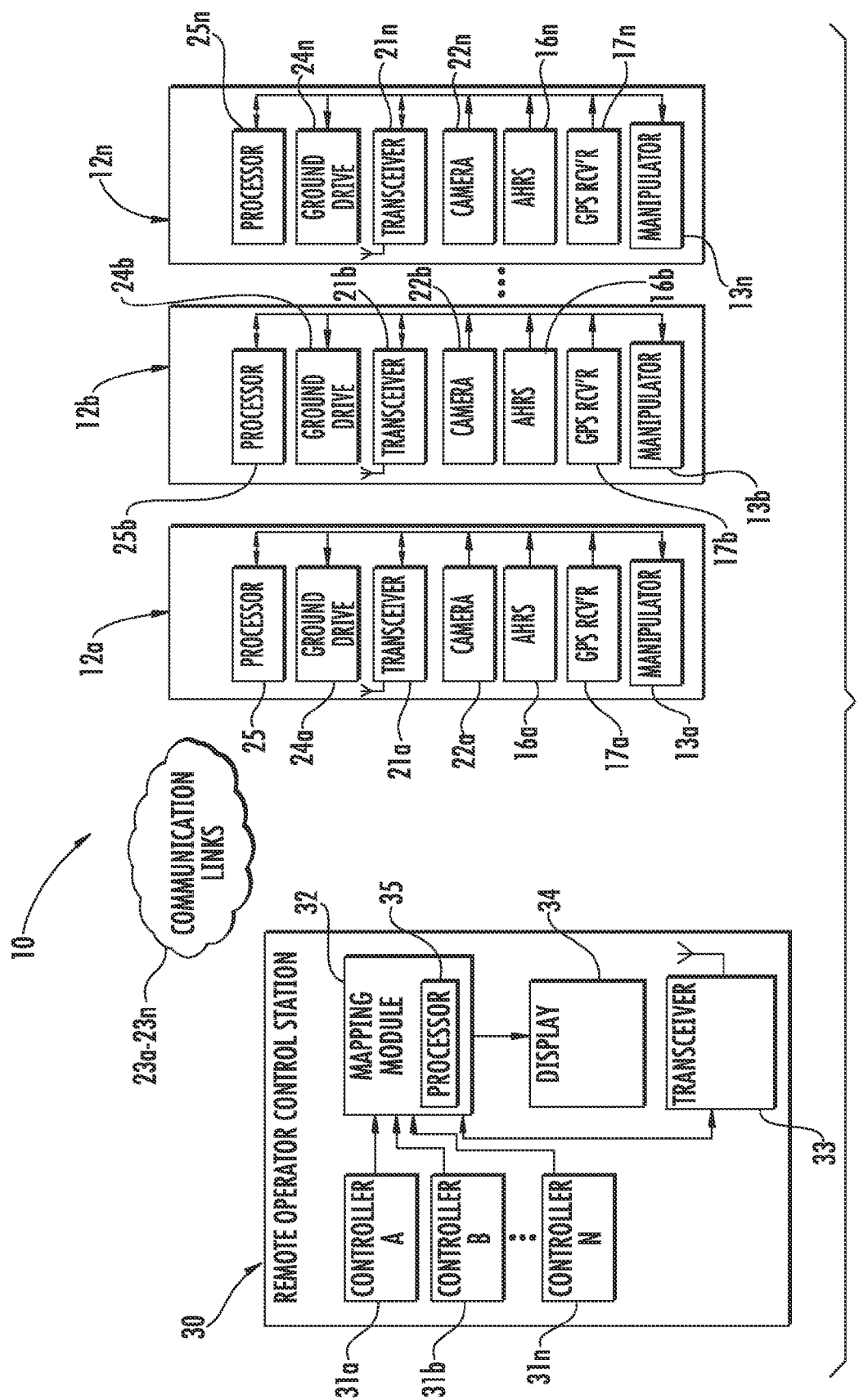
FIG. 2 is a more detailed schematic block diagram of a coordinated action robotic system of FIG. 1.

Referring initially to FIGS. 1 and 2, a coordinated action robotic system 10 illustratively includes a plurality of robotic vehicles 12a-12n. Each of the plurality of robotic vehicles 12a-12n includes a platform 15a-15n and a manipulator 13a-13n movable relative thereto. As will be appreciated by those skilled in the art, each robotic vehicle 12a-12n may include more than one manipulator 13a-13n, each moveable relative to the corresponding platform 15a-15n. Each manipulator 13a-13n may be, for example, a robotic arm that is capable of grasping and moving an object. Other types of manipulators may be used.

Each robotic vehicle 12a-12n also includes a ground drive arrangement 24a-24n carried by the platform 15a-15n. Illustratively, the ground drive arrangement 24a-24n includes a pair of individually driven tracks for good maneuverability in different terrain. Other types of ground drive arrangements may be used, such as a wheel-based ground drive arrangement, as will be appreciated by those skilled in the art. Of course, the platform drive arrangement may permit operation on water or other surfaces as well.

The robotic system 10 also illustratively includes a remote operator control station 30. The remote operator control station 30 includes a respective controller 31a-31n for each manipulator 13a-13n. Each respective controller 31a-31n, for example, as illustrated, may be a joystick. Other respective controllers (not shown) may also be used for controlling locomotion of each robotic vehicle 12a-12n. Other types of controllers may be used, and controller functionality may be shared, as will be appreciated by those skilled in the art.

Referring more particularly to FIG. 2, each robotic vehicle 12a-12n further illustratively includes an image sensor 22a-22n carried by the platform 15a-15n. For example, the image sensor 22a-22n may be a camera to advantageously provide an operator at the remote operation control station 30 a visual indication of the environment of each robotic vehicle 12a-12n. Other types of image sensors may be used, such as in infrared or night vision, as will be appreciated by those skilled in the art.

Each robotic vehicle 12a-12n also includes a sensor arrangement 16 for sensing a relative position and orientation between the platform and the manipulator 13a-13n. The sensor arrangement 16 may also cooperate with a robotic vehicle processor 25 to sense, for example, yaw, heading, and attitude of the platform 15a-15n. In some embodiments, yaw, heading, and attitude data may be provided by an Attitude Heading Reference System (AHRS). Yaw, heading, and attitude may be provided by other types of sensor arrangements, as will be appreciated by those skilled in the art.

Each robotic vehicle 12a-12n illustratively includes a geospatial position determining device 17. For example, each robotic vehicle 12a-12n may include a global positioning system (GPS) receiver 17 for determining geospatial position from a GPS satellite 11.

The sensed relative position and orientation between the platform 15a-15n and the manipulator 13a-13n, along with the yaw, heading and attitude data, may be communicated to the remote operator control station 30 via the respective robotic vehicle transceiver 21a-21n. The robotic vehicle transceiver 21a-21n may communicate with the remote operator control station transceiver 33 via a respective communications link 23a-23n between each robotic vehicle 12a-12n and the remote operator control station.

Each respective communications link 23a-23n illustratively includes a wireless communications link. For example, the wireless communications link may be an RF communications link. In other embodiments, some or all of the respective communications links 23a-23n may be wired communications links, for example, as provided by tether assemblies. Other wired or wireless communications links may be used, as will be appreciated by those skilled in the art.

The geospatial position data may be similarly communicated to the remote operator control station 30, and may be communicated over the respective communications links 23a-23n. Additional communications links (not shown) may be provided for communicating the geospatial position data. Other data, for example, robotic vehicle locomotion commands from the remote operator control station 30 and image sensor data or images associated with each image sensor 22a-22n, may also be communicated over each communications link 23a-23n. Images associated with each image sensor 22a-22n are displayed on a display 34 included at the remote operator control station 30. Other robotic vehicle sensors, including state-of-health and power supply sensors may also be included.

The remote operator control station 30 includes a processor 35 that, in turn, includes a mapping module 32, to map movement of each manipulator 13a-13n relative to its platform 15a-15n so that operation of the controllers 31a-31n for manipulator movement in a given direction produces corresponding movement of the respective manipulators in the given direction.

Based upon the relative position and orientation between each platform 15a-15n and its corresponding manipulator 13a-13n received by the remote operator control station transceiver 33, the mapping module 32 maps movement of each manipulator. The mapping module 32 may additionally geospatially map movement of each manipulator 13a-13n based upon the received geospatial position of each robotic vehicle 12a-12n.

The mapping module 32 advantageously maps movement of each manipulator 13a-13n based upon a common coordinate system. As will be appreciated by those skilled in the art, the common coordinate system may be based upon a selected one of any of the robotic vehicles 13a-13n. In some embodiments, the common coordinate system may be based upon a target object 14, or may be based upon any other defined coordinate system.

Figure 3:
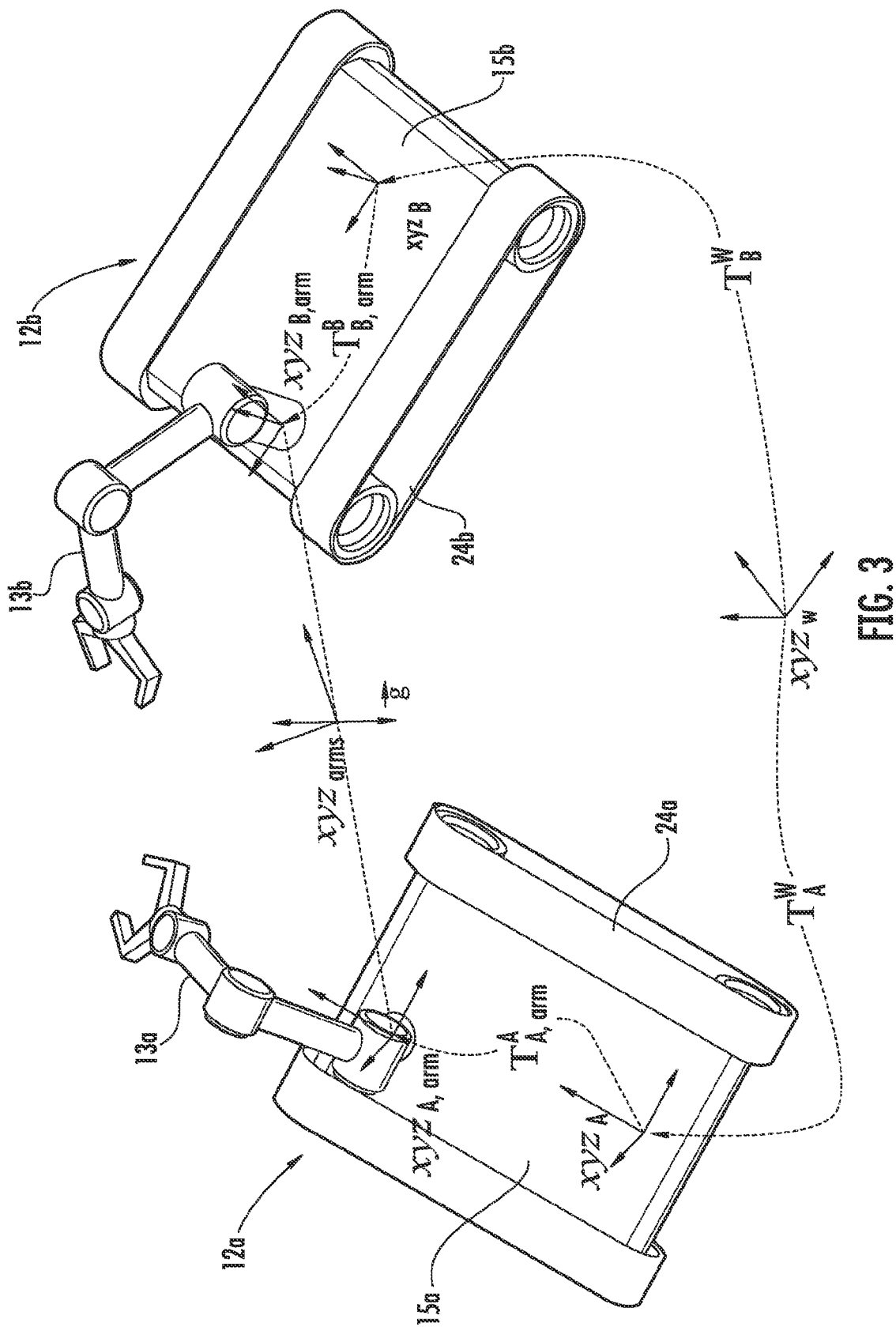
FIG. 3 is a perspective view illustrating the operation of the mapping module at the robotic vehicles of FIG. 2.

Referring now additionally to FIG. 3, an example of the operation of the mapping module 32 is now described. Illustratively, robotic vehicles 12a, 12b each have a different orientation with reference to the world coordinate system $xyz_w$. An AHRS 16a, 16b, for example, provides the global orientation, denoted by $xyz_A$ and $xyz_B$, of the robotic vehicles 12a, 12b with respect to the world coordinate system $xyz_w$. The mapping module 32 defines the elements of the transforms $T_A^w$ and $T_B^w$, respectively. Transforms $T_{A,arm}^A$ and $T_{B,arm}^B$, represent transformation matrices to the respective platforms 15a, 15b of each manipulator 13a, 13b with respect to the respective coordinate systems at the vehicles 12a, 12b.

Based upon the above orientation information, including the transforms, the mapping module 32 calculates a unit vector pointing from $xyz_{A,arm}$ to $xyz_{B,arm}$. The unit vector is illustratively represented by $\vec{x}'_{arms}$ and $\vec{g}$ represents the unit vector pointing in the direction of gravity, as measured by the AHRS 16a, 16b.

A $\vec{y}_{arms}$ vector can be formed by crossing $\vec{x}'_{arms}$ with $\vec{g}$, for example, $\vec{y}_{arms} = \vec{x}'_{arms} \times \vec{g}$. Similarly, $\vec{x}_{arms}$ and $\vec{z}_{arms}$ can be formed according to the following: $\vec{x}_{arms} = \vec{g} \times \vec{y}_{arms}$, $\vec{z}_{arms} = -\vec{g}$. The mapping module 32 can compute the coordinate system $xyz_{arms}$ and advantageously update it on-the-fly to account for movement of each robotic vehicle 12a, 12b with respect to the world coordinate system $xyz_w$. The common coordinate system $xyz_{arms}$ is illustratively referenced at the midpoint between $xyz_{A,arm}$, and $xyz_{B,arm}$, respectively. Motion commands from the controllers 31a, 31b are performed in the common coordinate system $xyz_{arms}$. In other words, input to each of the controllers 31a, 31b is mapped in the common coordinate system $xyz_{arms}$.

Figure 4:
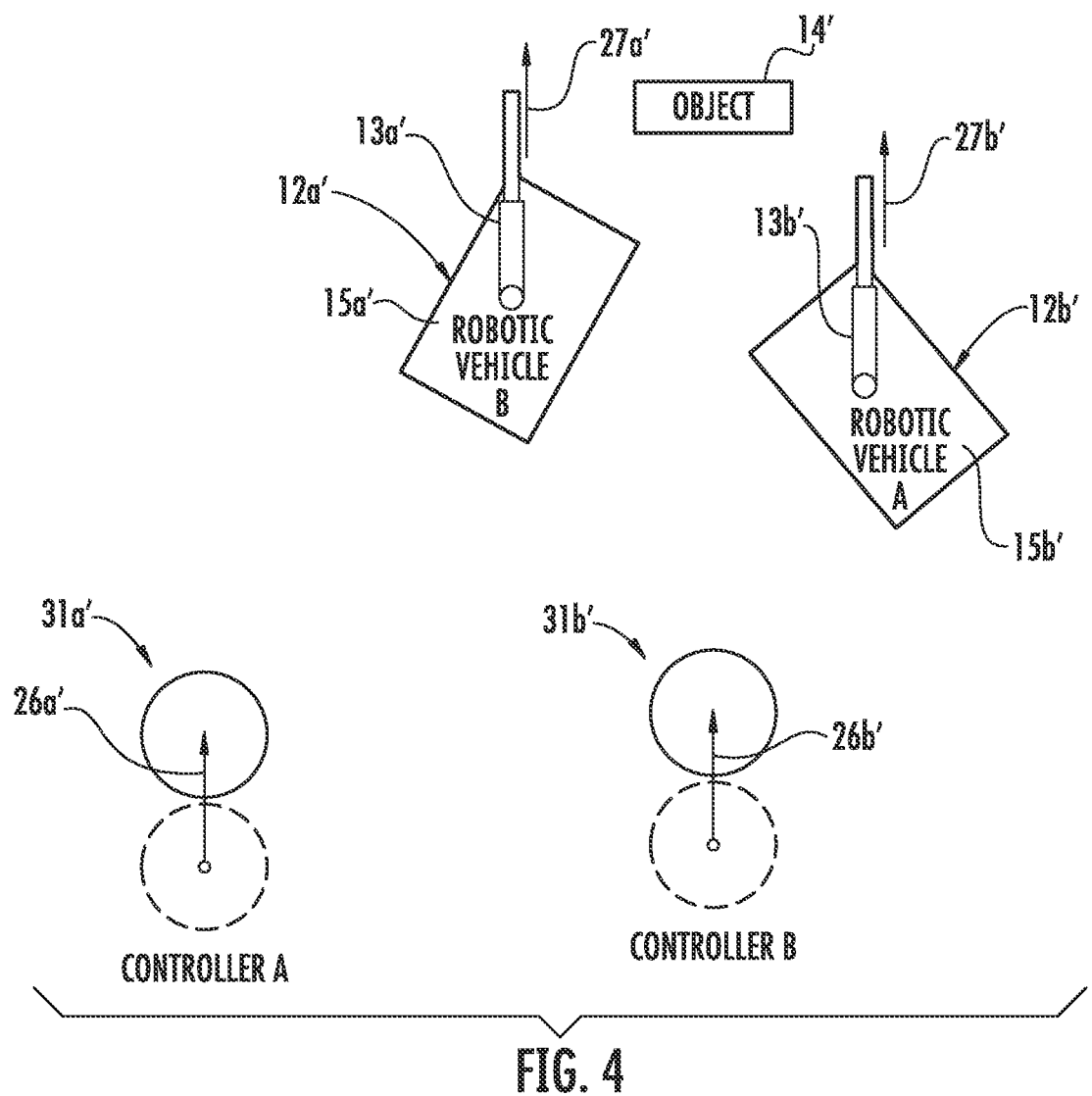
FIG. 4 is a schematic plan view illustrating mapped movement of the system of FIG. 2.

Referring now additionally to FIG. 4, in another embodiment, the common coordinate system is illustratively based upon a selected robotic vehicle 12a'. Illustratively, the selected robotic vehicle 12a' has a different orientation with reference to the target object 14'. A movement of the controller 31a', or joystick, in a direction indicated by the arrow 26a' corresponds to movement of the manipulator 13a' in a corresponding direction indicated by the arrow 27a'. Advantageously, the mapping module 32' maps the movement of the manipulator 13a' based upon the common coordinate system associated with the robotic vehicle 12a'. Accordingly, a movement of the controller 31b' in a same direction as the controller 31a', as indicated by the arrow 26b', corresponds to movement of the manipulator 13b' in the same direction, as indicated by the arrow 27b'. As will be appreciated by those skilled in the art, a movement of the controller 31b' in a direction opposite to the movement of the controller 31a', corresponds to a movement of the manipulator 13b' in a direction opposite to the direction of the manipulator 13a'.

Advantageously, the mapping of the movement of each manipulator 13a, 13b relative to its platform 15a, 15b to a common coordinate system so that operation of the controllers 31a, 31b for manipulator movement in a given direction produces corresponding movement of the respective manipulators in the given direction allows the robotic vehicles 12a, 12b to be controlled as if they were one robotic vehicle. Indeed, the coordinated movement may result in increased operational efficiency, increased operational dexterity, and increased ease of controlling the robotic vehicles 12a, 12b.

As will be appreciated by those skilled in the art, any number of additional robotic vehicles may be included in the coordinated action robotic system 10 described above. Where more than two robotic vehicles are included in the coordinated action robotic system 10, a common coordinate system is created and the movement of each manipulator 13a, 13b, in other words, controller input commands, are mapped to the common coordinate system, as described above.

Figure 5:
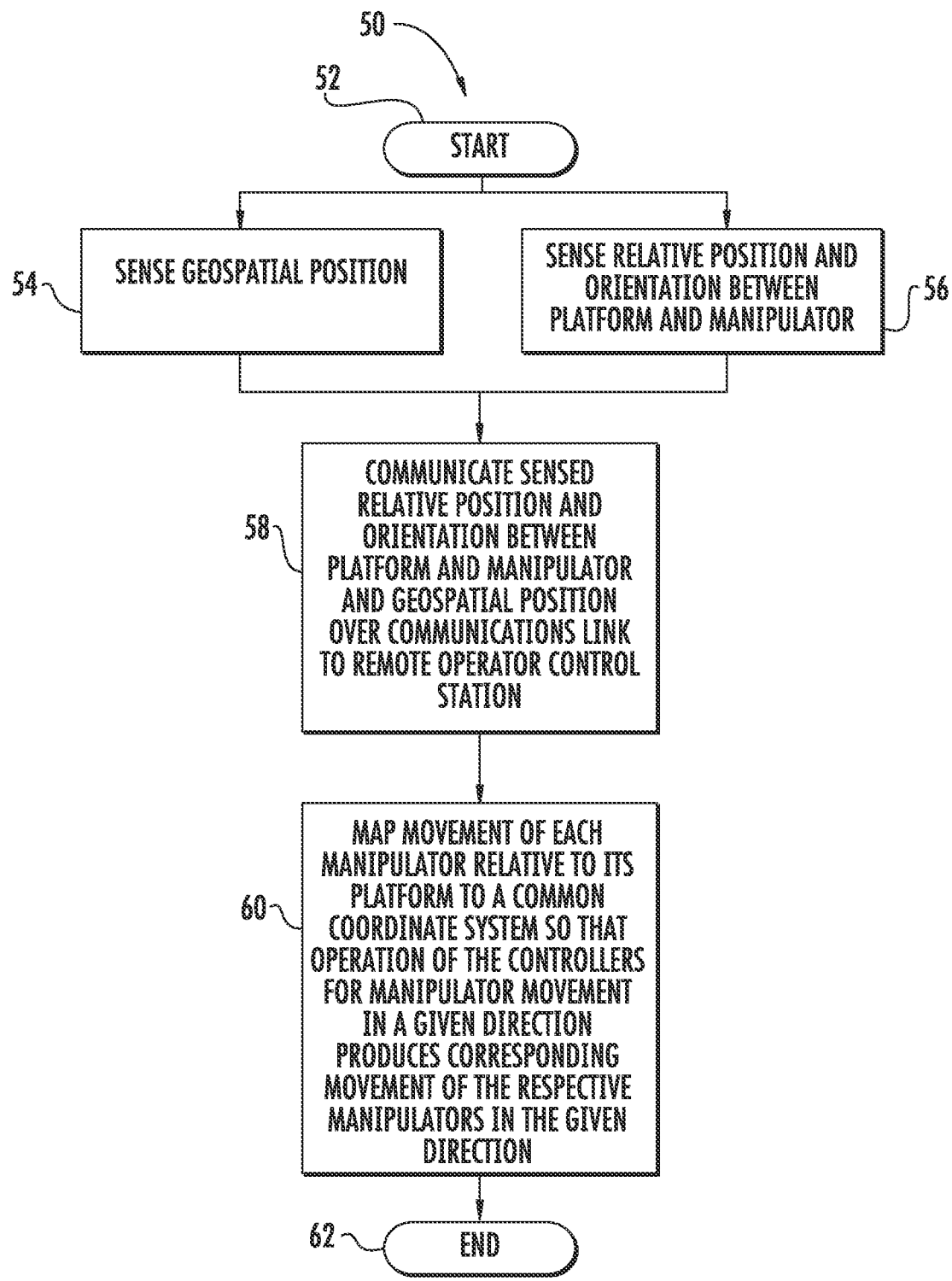
FIG. 5 is a flow chart illustrating a method of coordinating robotic action in accordance with the present invention.

Referring now to the flowchart 50 of FIG. 5, a method aspect includes coordinating robotic action in a robotic system 10 including a plurality of robotic vehicles 12a-12n. Each robotic system 10 includes a platform 15a-15n and a manipulator 13a-13n movable relative thereto. Each robotic system 10 also includes a remote operator control station 30 that includes a respective controller 31a-31n for each manipulator 13a-13n. Beginning at Block 52, the method includes sensing a geospatial location at Block 54 determined by a geospatial position determining device on each robotic vehicle. At Block 56, a relative position and orientation between each platform 15a-15n and the respective manipulator 13a-13n are sensed by a sensor 16 arrangement on each robotic vehicle 12a-12n. The sensor arrangement 16 also senses yaw, heading, and attitude of each respective platform 15a-15n.

The sensed relative position and sensed orientation between each platform 15a-15n and the respective manipulator 13a-13n, along with the geospatial position are communicated over each respective communications link 23a-23n to the remote operator control station at Block 58. At Block 60 movement of each manipulator 13a-13n relative to its platform 15a-15n is mapped to a common coordinate system. Mapping results in operation of the controllers 31a-31n for manipulator movement in a given direction producing corresponding movement of the respective manipulators 13a-23n in the given direction before ending at Block 62. In some embodiments, for example, as described above with reference to FIG. 4, the common coordinate system may be based upon a selected one of the robotic vehicles.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A coordinated action robotic system comprising:
a plurality of robotic vehicles, each comprising a platform and at least one manipulator movable relative thereto; and
a remote operator control station comprising
a respective controller for each manipulator, and
a mapping module to map movement of each manipulator relative to its platform so that operation of said controllers for manipulator movement in a given direction produces corresponding movement of the respective manipulators in the given direction irrespective of an orientation of each manipulator relative to said controllers.

2. The robotic system according to claim 1 wherein said mapping module maps movement of each manipulator based upon a common coordinate system.

3. The robotic system according to claim 2 wherein the common coordinate system is based upon a selected one of said plurality of robotic vehicles.

4. The robotic system according to claim 1 wherein each of said plurality of robotic vehicles comprises a sensor arrangement for sensing a relative position and orientation between said platform and said at least one manipulator; and wherein said mapping module maps movement of each manipulator based upon the relative position and orientation between each platform and at least one manipulator.

5. The robotic system according to claim 4 wherein said sensor arrangement further senses yaw, heading, and attitude of said platform.

6. The robotic system according to claim 1 wherein each of said plurality of robotic vehicles further comprises a geospatial position determining device; and wherein said mapping module maps movement of each manipulator based upon the geospatial position of each robotic vehicle.

7. The robotic system according to claim 1 further comprising a respective communications link between each robotic vehicle and said remote operator control station.

8. The robotic system according to claim 7 wherein at least one of said communications links comprises a wireless communications link.

9. The robotic system according to claim 1 wherein each of said plurality of robotic vehicles further comprises at least one image sensor carried by said platform; and wherein said remote operator control station further comprises at least one display for displaying images from said image sensors.

10. The robotic system according to claim 1 wherein each of said plurality of robotic vehicles further comprises a ground drive arrangement carried by said platform.

11. A coordinated action robotic system comprising:
a plurality of robotic vehicles, each comprising
a platform,
at least one manipulator movable relative to said platform, and a sensor arrangement for sensing a relative position and orientation between said platform and said at least one manipulator; and a remote operator control station comprising a respective controller for each manipulator, and a mapping module to map to a common coordinate system, movement of each manipulator based upon the relative position and orientation between each platform and at least one manipulator so that operation of said controllers for manipulator movement in a given direction produces corresponding movement of the respective manipulators in the given direction irrespective of an orientation of each manipulator relative to said controllers.

12. The robotic system according to claim 11 wherein the common coordinate system is based upon a selected one of said plurality of robotic vehicles.

13. The robotic system according to claim 11 wherein said sensor arrangement further senses yaw, heading, and attitude of said platform.

14. The robotic system according to claim 11 wherein each of said plurality of robotic vehicles further comprises a geospatial position determining device; and wherein said mapping module maps movement of each manipulator based upon the geospatial position of each robotic vehicle.

15. The robotic system according to claim 11 further comprising a respective communications link between each robotic vehicle and said remote operator control station.

16. The robotic system according to claim 15 wherein at least one of said communications links comprises a wireless communications link.

17. The robotic system according to claim 11 wherein each of said plurality of robotic vehicles further comprises at least one image sensor carried by said platform; and wherein said remote operator control station further comprises at least one display for displaying images from said image sensors.

18. The robotic system according to claim 11 wherein each of said plurality of robotic vehicles further comprises a ground drive arrangement carried by said platform.

19. A method of coordinating robotic action in a robotic system comprising a plurality of robotic vehicles, each comprising a platform and at least one manipulator movable relative thereto, and a remote operator control station comprising a respective controller for each manipulator, the method comprising:

mapping movement using the remote operator control station of each manipulator relative to its platform so that operation of the controllers for manipulator movement in a given direction produces corresponding movement of the respective manipulators in the given direction irrespective of an orientation of each manipulator relative to the controllers.

20. The method according to claim 19 wherein mapping movement of each manipulator comprises mapping movement based upon a common coordinate system.

21. The method according to claim 20 wherein the common coordinate system is based upon a selected one of the plurality of robotic vehicles.

22. The method according to claim 19 wherein mapping movement of each manipulator comprises mapping movement of each manipulator based upon a relative position and orientation between each platform and at least one manipulator sensed by a sensor arrangement on each of the plurality of robotic vehicles.

23. The method according to claim 22 wherein the sensor arrangement further senses yaw, heading, and attitude of the platform.

24. The method according to claim 19 wherein mapping movement of each manipulator comprises mapping movement based upon the geospatial position of each of the plurality of robotic vehicles determined by a geospatial position determining device on each of the plurality of robotic vehicles.

* * * * *